(12) United States Patent
Fukuda

(10) Patent No.: US 7,747,227 B2
(45) Date of Patent: Jun. 29, 2010

(54) TRANSMISSION MODULE

(75) Inventor: Yasushi Fukuda, Yokohama (JP)

(73) Assignee: Fujitsu Media Devices Limited, Yokohama (JP)

(*) Notice: Subject to any disclaimer, the term of this patent is extended or adjusted under 35 U.S.C. 154(b) by 276 days.

(21) Appl. No.: 11/187,805

(22) Filed: Jul. 25, 2005

(65) Prior Publication Data

US 2006/0019620 A1 Jan. 26, 2006

(30) Foreign Application Priority Data

Jul. 26, 2004 (JP) ............... 2004-218002

(51) Int. Cl.
*H04B 1/02* (2006.01)
*H04B 1/04* (2006.01)
*H01Q 11/12* (2006.01)

(52) U.S. Cl. .............. 455/91; 455/127.1; 333/109

(58) Field of Classification Search ............ 455/78–88, 455/114.2–115.4, 126–129, 333, 91; 333/16, 333/246–247, 109, 116
See application file for complete search history.

(56) References Cited

U.S. PATENT DOCUMENTS 3,641,451 A * 2/1972 Hollingsworth et al. ..... 330/134
5,038,112 A * 8/1991 O'Neill .................... 330/207 P
5,450,046 A * 9/1995 Kosugi et al. ............... 333/246
5,903,820 A * 5/1999 Hagstrom .................... 455/82
5,946,794 A * 9/1999 Koizumi et al. ............... 29/600
5,956,627 A * 9/1999 Goos ....................... 455/127.1
6,236,271 B1 * 5/2001 Vakilian .................... 330/279
6,366,770 B1 * 4/2002 Seshita et al. ............. 455/277.1
6,397,077 B1 * 5/2002 Jensen ..................... 455/553.1
6,556,815 B1 * 4/2003 Shibamura .................. 455/126
6,573,808 B1 * 6/2003 Burin ........................ 333/132

FOREIGN PATENT DOCUMENTS

| JP | 8-307286 | 11/1996 |
| JP | 10-303761 | 11/1998 |
| JP | 2000-295055 | 10/2000 |
| JP | 2002-43813 A | 2/2002 |
| JP | 2003-298430 A | 10/2003 |
| JP | 2004-48798 A | 2/2004 |

* cited by examiner

*Primary Examiner*—Simon D Nguyen
(74) *Attorney, Agent, or Firm*—Arent Fox LLP

(57) ABSTRACT

A transmission module includes: a power amplifier amplifies power of a radio frequency signal that is to be transmitted via an antenna; a coupler that allows the radio frequency signal from the power amplifier to travel toward the antenna and causes adverse radio frequency power to ground; and a substrate provided with the power amplifier and the coupler.

4 Claims, 8 Drawing Sheets

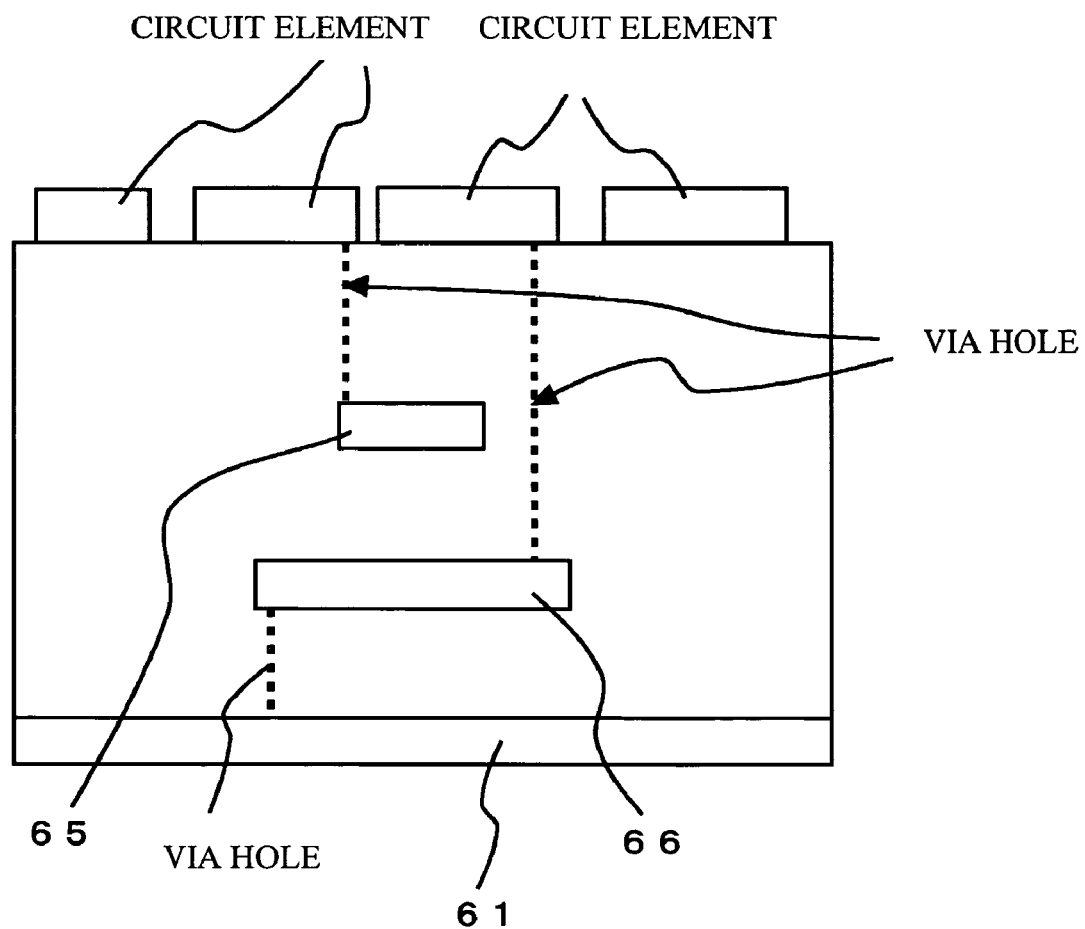

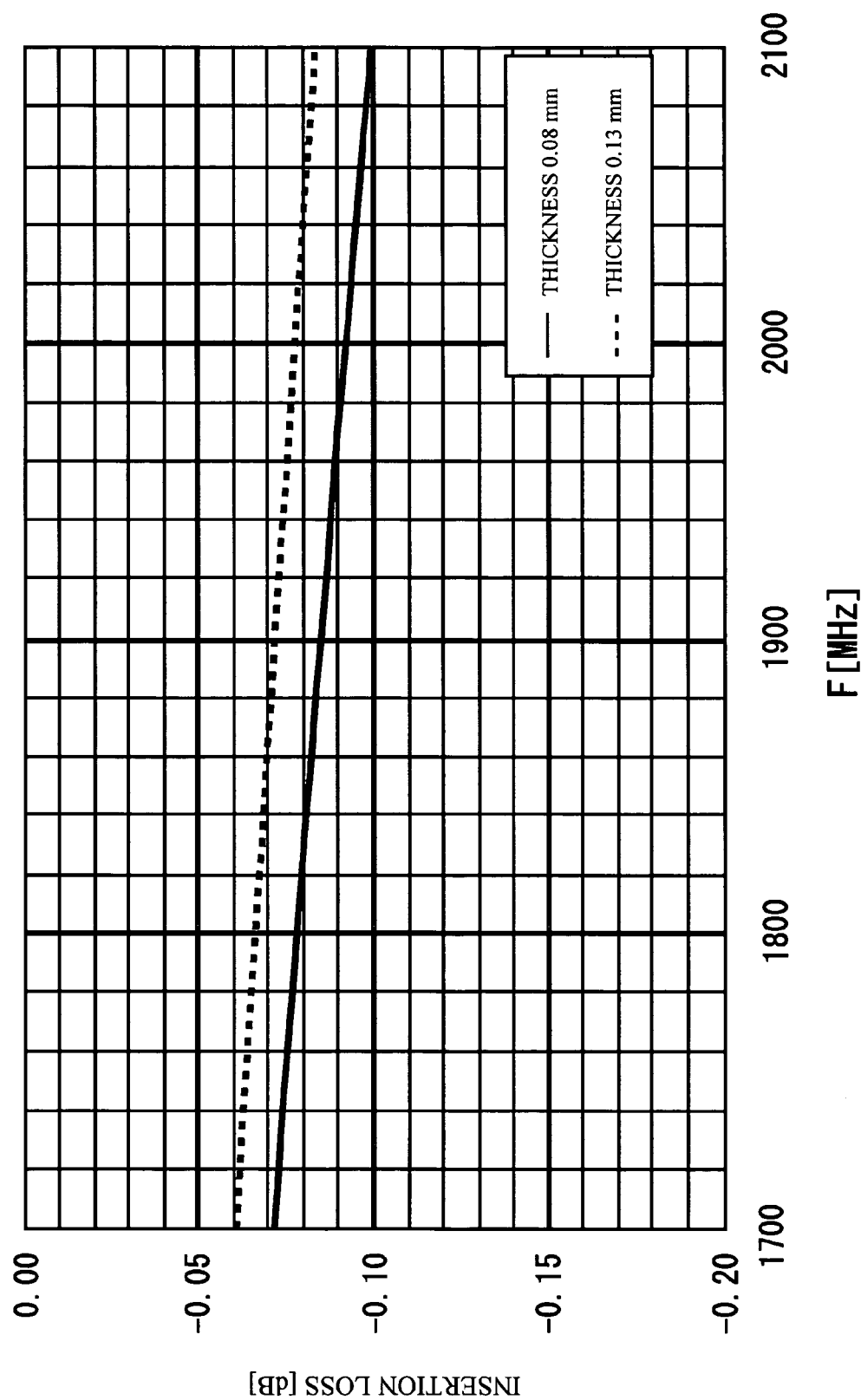

TRANSMISSION MODULE

BACKGROUND OF THE INVENTION

1. Field of the Invention

The present invention generally relates to a transmission module incorporated in a cellular telephone for mobile communications or the like.

2. Description of the Related Art

FIG. 1 shows the configuration of a conventional transmitter unit 40. The transmitter unit 40 amplifies the power of a radio frequency (high frequency) signal on which data are superimposed and outputs the amplified radio frequency signal through an antenna. The transmitter unit 40 has a SAW (Surface Acoustic Wave) filter 41, a driver amplifier 42, a power amplifier 43, a coupler 44, an isolator (circulator) 45, and a duplexer 46, which are connected in this order. The coupler 44 branches a part of the transmitted signal amplified by the power amplifier 43 into a detector 47 so that the transmitted signal is fed back to the power amplifier 43 for output stabilization.

A transmitted signal Tx is mixed with a local oscillation (LO) signal and is thus converted into the radio frequency signal. The driver amplifier 42 and the power amplifier 43 amplify the power of the radio frequency signal so as to have a given gain. The amplified radio frequency signal is output via an antenna 50.

The coupler 44 branches part of the transmitted signal amplified by the power amplifier 43 into the detector 47. Then, the detector 47 converts the transmitted signal (RF signal) from the coupler 44 into a voltage. The output voltage increases as the input power increases. The voltage output by the detector 47 is compared with a given signal level by a baseband unit 10, which controls the power amplifier 43 on the basis of the difference between the voltage output and the given signal level. The baseband unit 10 may be an IC device.

The duplexer 46 is a filter device that separates the transmitted signal to be sent via the antenna 50 and the frequency range of the received signal from each other. The duplexer 46 prevents the transmitted signal from traveling to the receiver side and prevents the received signal from traveling to the transmitter side. The isolator 45 outputs the transmitted signal from the coupler 44 to the duplexer 46, and prevents a component of the received signal leaked to the transmitter side from being applied to the power amplifier 43.

The isolator 45 functions to protect the power amplifier 43 from the leaked component of the signal received through the antenna 50. Generally, the isolator 45 employs a combination of ferrite magnets, and has a large size, which occupied a large circuitry area. In addition, power consumption takes place in the isolator 45.

Japanese Patent Application Publication Nos. 2000-295055 (Patent Document 1) and 8-307286 (Patent Document 2) show configurations of the transmitter circuits from which the isolators are eliminated. Patent Document 1 discloses a variable load circuit on a signal line between the output terminal of the power amplifier and the antenna. Further, there is provided a control circuit, which detects the direction and level of a variation in the load on the output side of the power amplifier and adjusts the load of the variable load circuit to compensate for the variation. Patent Document 2 discloses a directional coupler interposed between the power amplifier and the antenna. The output power of the power amplifier is controlled on the basis of the power of the reflected wave from the directional coupler.

The transmitter unit 40 shown in FIG. 4 is composed of the discrete circuit elements. This makes it difficult to achieve impedance matching in the transmitter unit 40 and needs troublesome work. Further, the isolator is essentially needed to cope with noise externally applied.

SUMMARY OF THE INVENTION

The present invention has been made in view of the above circumstances and provides a transmission module in which impedance matching can easily be designed.

According to an aspect of the present invention, there is provided a transmission module including: a power amplifier amplifies power of a radio frequency signal that is to be transmitted via an antenna; a coupler that allows the radio frequency signal from the power amplifier to travel toward the antenna and causes adverse radio frequency power to ground; and a substrate provided with the power amplifier and the coupler.

The transmission module may further include: a filter that is arranged in front of the power amplifier and eliminates unnecessary components from the radio frequency signal; a detector detecting part of the radio frequency signal branched into the detector by the coupler; and a duplexer that is provided between the antenna and the coupler and extracts a signal received by the antenna, the filter, the detector and the duplexer being mounted on the substrate.

The transmission module may be configured so that the coupler has multiple striplines.

The transmission module may be configured so that the coupler has multiple striplines respectively provided on different layers that form the substrate.

The transmission module may be configured so that: the substrate has a first dielectric layer, a core layer and a second dielectric layer, which layers are laminated; and the coupler has multiple strip lines respectively provided on two opposing surfaces of the core layer.

BRIEF DESCRIPTION OF THE DRAWINGS

Preferred embodiments of the present invention will be described in detail based on the following figures, wherein:

FIG. 6 is a cross-sectional view of the coupler on which circuit elements are mounted so that a single module is formed;

FIG. 7 is a graph of an insertion loss vs. frequency characteristic of two samples of the coupler;

DESCRIPTION OF THE PREFERRED EMBODIMENTS

A description will now be given, with reference to the accompanying drawings, of embodiments of the present invention.

Figure 2:
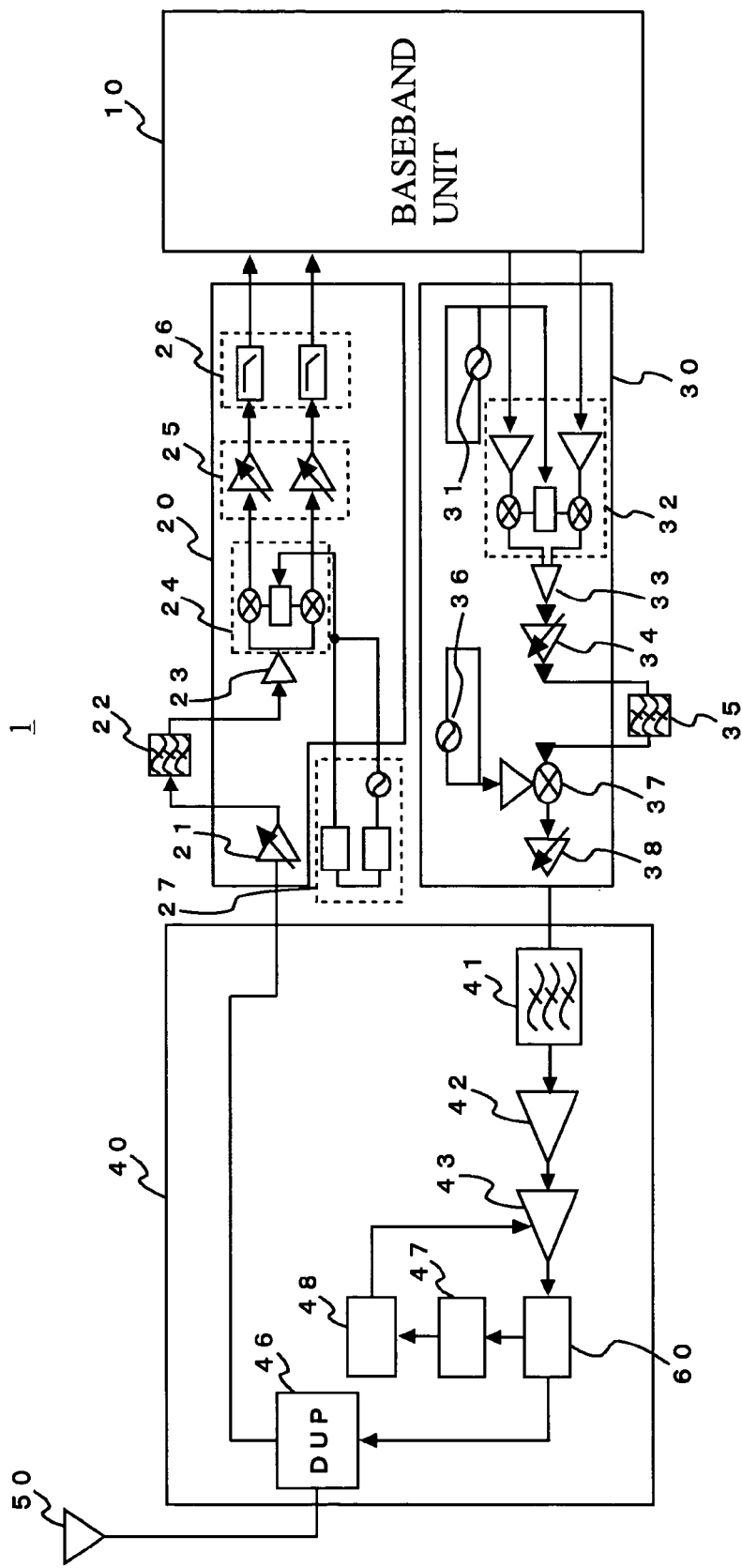
FIG. 2 is a block diagram of a cellular phone to which a transmission module of the present invention is applied.

Referring to FIG. 2, there is illustrated a cellular phone 1 in which a transmission module of the present invention is incorporated. The cellular phone 1 is equipped with the baseband unit 10, a receiver section 20, a transmitter section 30, a radio frequency section (transmission module) 40A, and the antenna 50.

The baseband unit 10 is an LSI device and mainly has three functions. The first function is baseband signal processing for the baseband transmitted signal to be supplied to the transmitter section 30 and the baseband received signal supplied from the receiver section 20. The second function is control processing such as a communications control and a peripheral circuit control. The third function is voice encoding/decoding.

The receiver section 20 has a low-noise amplifier (LNA) 21, a bandpass filter (BPF) 22, a splitter 23, a demodulator 24, a variable gain amplifier 25, a filter 26 and a phase synchronizing unit 27.

The low-noise amplifier 21 amplifies the received signal, and the bandpass filter 22 eliminates signal components in the unnecessary frequencies ranges from the amplified received signal. The signal that has passed through the bandpass filter 22 is mixed with local oscillation signals from the phase synchronizing unit 27 by mixers in the demodulator 24. The variable gain amplifier 25 amplifies intermediate frequency signals produced by mixing. The filter 26 allows the frequency components in specific frequency ranges to pass. The output signals thus processed are applied to the baseband unit 10, which processes the applied signals in various ways to finally reproduce received data.

The transmitter section 30 has a first local oscillator 31, a modulator 32, a combiner 33, a variable gain amplifier 34, a bandpass filter (BPF) 35, a second local oscillator 36, a mixer 37 and a variable gain amplifier 38.

The modulator 32 modulates the baseband signals of two sequences output by the baseband unit 10 with the first local oscillation signal of the first local oscillator 31. The combiner 33 combines the modulated signals into a resultant orthogonal modulated signal. The variable gain amplifier 34 amplifies the orthogonal modulated signal. The bandpass filter 35 eliminates the signal components in the unnecessary frequency ranges from the amplified orthogonal modulated signal. The mixer 37 mixes the orthogonal modulated signal from the bandpass filter 35 with the second local oscillation signal from the second local oscillator 36. The variable gain amplifier 38 amplifies the mixed modulated signal, so that the radio frequency signal to be transmitted can be produced.

The radio frequency section 40A will now be described. In FIG. 2, similar reference numerals refer to similar elements shown in FIG. 1. The radio frequency unit 40A includes the SAW filter 41, the driver amplifier 42, the power amplifier 43, a coupler 60, the duplexer (DUP) 46, and the detector 47. The driver amplifier 42 and the power amplifier 43 form a power supply unit. The radio frequency section 40A does not employ the isolator 45 that is used in the conventional transmission module. The coupler 60 has a different structure from the conventional coupler 41.

Figure 3:
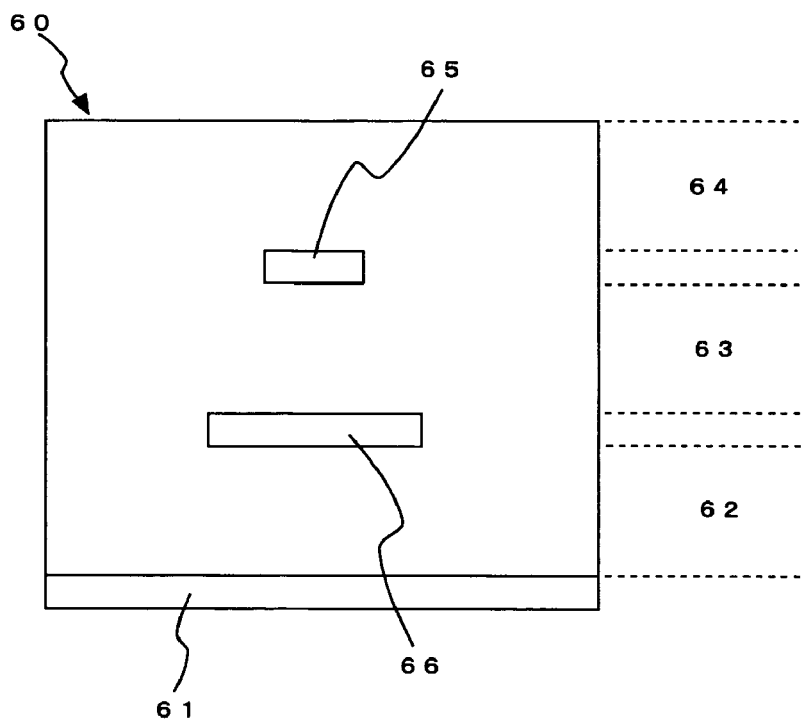
FIG. 3 is a cross-sectional view of a coupler used in the transmission module shown in FIG. 2.

Referring to FIG. 3, the coupler 60 has a multilayer substrate composed of a ground layer 61, a first pre-impregnated sheet material (first dielectric layer) 62, a core layer 63, and a second pre-impregnated sheet material (second dielectric layer) 64. A first stripline 65 is formed between the second dielectric layer 64 and the core layer 63, and a second stripline 66 is formed between the core layer 63 and the first dielectric layer 62.

Figure 4:
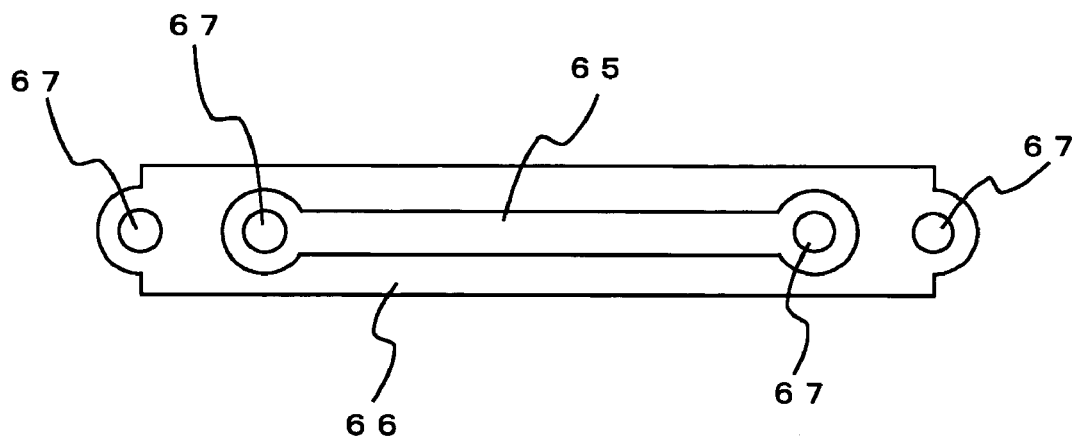
FIG. 4 shows first and second strip lines of the coupler shown in FIG. 3.

Via holes 67 are formed in the opposing ends of each of the first and second striplines 65 and 66, as shown in FIG. 4. The via holes 67 penetrate through the core layer 63, and the first and second dielectric layers 62 and 64. The via holes 67 are filled with a metal so that electric connections can be made among the first and second striplines 65 and 66 and components of the radio frequency section 40A formed on the second dielectric layer 64. The second stripline 66 is connected to the ground layer 61 through the via holes 67 and a resistor.

Figure 5A:
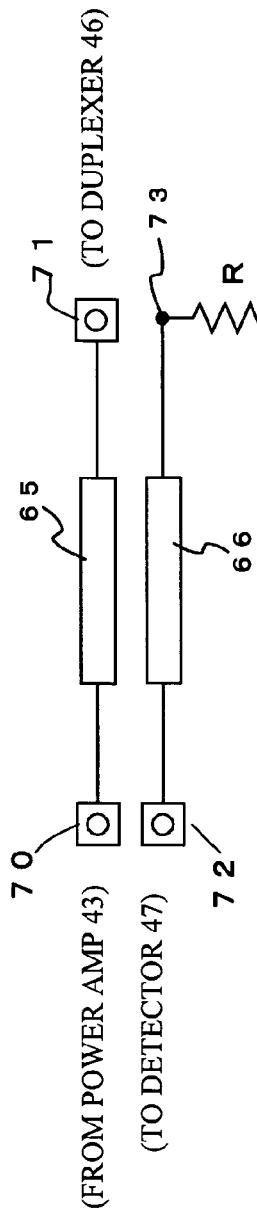
FIG. 5A is an equivalent circuit of the coupler.

FIG. 5A is an equivalent circuit of the coupler 60. An input terminal 70 is connected to the power amplifier 46 shown in FIG. 2. A first output terminal 71 is connected to the duplexer 46 shown in FIG. 2. A second output terminal 72 is connected to the detector 47 shown in FIG. 2. The input terminal 70 is connected to the first output terminal 71 through the first stripline 65. A third output terminal 73 and a signal line, which is grounded through a resistor R, are connected to the second stripline 66.

Figure 5B:
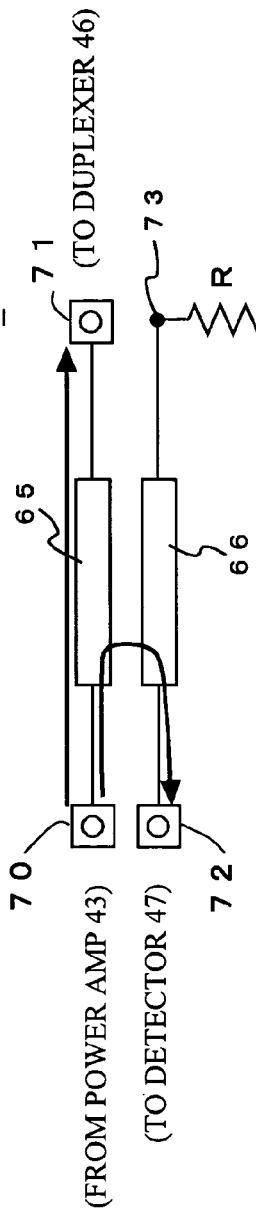
FIGS. 5B and 5C show flows of signals on the coupler.
Figure 5C:
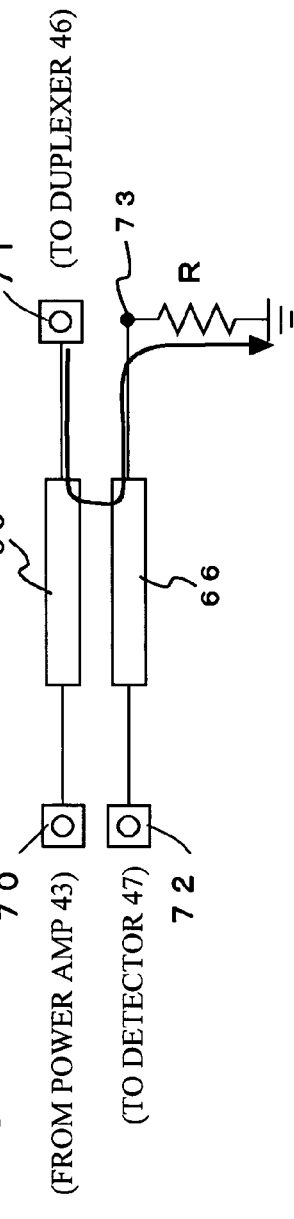

As shown in FIG. 5B, the input signal applied to the input terminal 70 is output to the first output terminal 71 and is also output to the second output terminal 72 due to the function of coupling. The output signal available at the first output terminal 71 is applied to the antenna 50 via the duplexer 46. The output signal available at the second output terminal 72 is applied to the detector 47. The baseband unit 10 compares the signal from the detector 47 with the given level, and controls the power amplifier 43 on the basis of the difference therebetween.

The radio frequency power leaked from the antenna 50 passes through the coupler 60 from the first output terminal 71 and is applied to the second stripline 66 due to the coupling function. Then, the adverse radio frequency power leaked from the antenna 50 flows to the ground through the resistor R, and does not travel to the power amplifier 43, which cannot be damaged.

Figure 1:
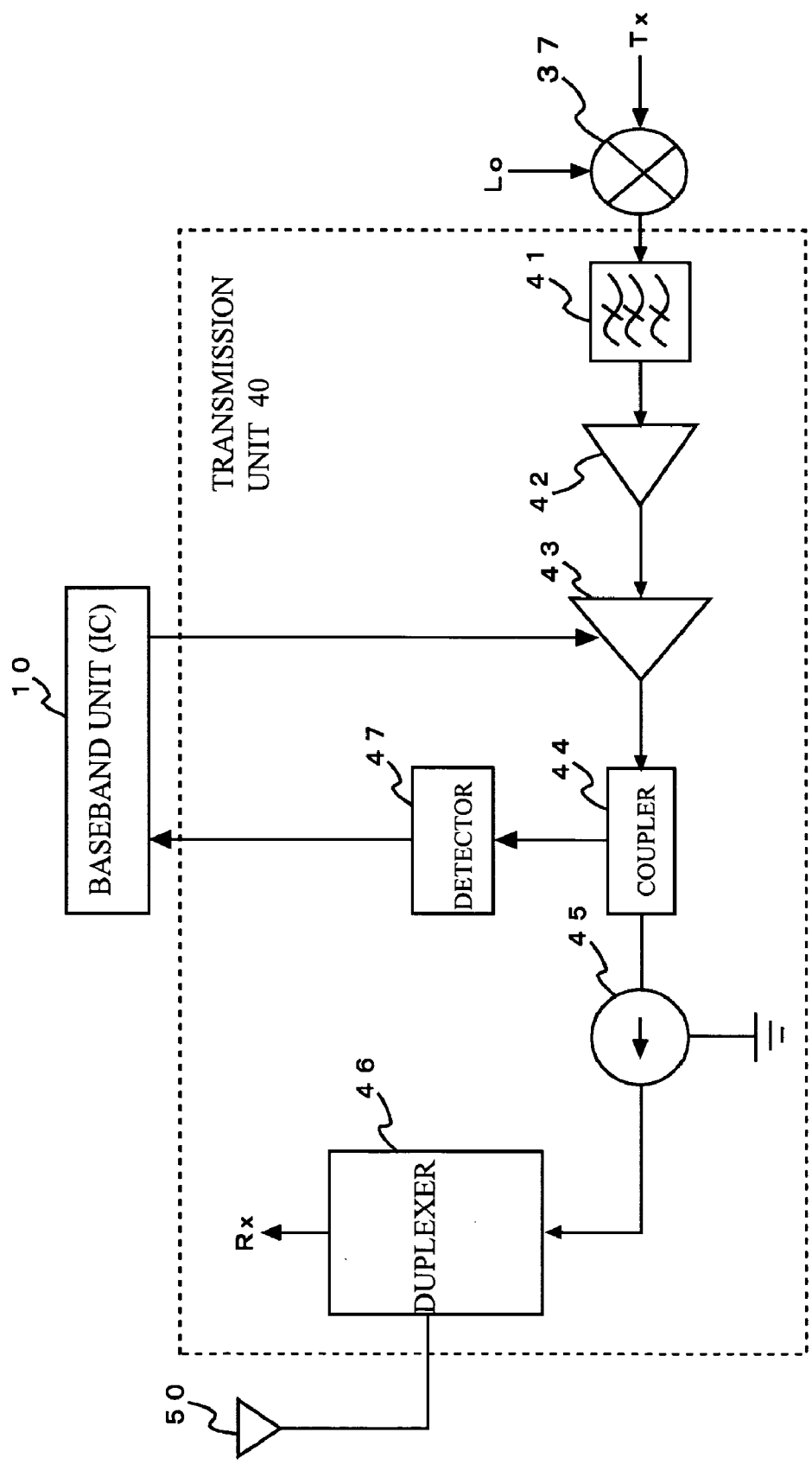
FIG. 1 shows a conventional transmitter unit.

As shown in FIG. 6, on the upper surface of the second dielectric layer 64, there are provided the circuit elements of the radio frequency section 40A, namely, the SAW filter 41, the driver amplifier 42, the power amplifier 43, the detector 47, the duplexer 46 and circuit elements such as chip capacitors and resistors. The coupler 60 and the circuit elements of the high-frequency section 40A are assembled as a single module. The circuit elements on the coupler 60 are connected to the first stripline 65 and/or second stripline 66 through the via holes. It is to be noted that the conventional radio frequency unit 40 formed by combining the discrete components essentially needs the isolator 45 in order to cope with the leakage of RF power, as shown in FIG. 1. In contrast, the radio frequency section 40 is the single module having the coupler 60 of the multilayer structure on which the circuit elements are mounted. With this structure, ideal impedance matching can be designed at the initial step of the design work. This restrains unnecessary reflection and improves the VSWR (Voltage Standing Wave Ratio). In addition, the isolator 45 is no longer needed. This contributes to downsizing and power reduction of the transmission module.

FIG. 7 is a graph of an insertion loss vs. frequency characteristic of two samples of the coupler 60, one of which has the resistor R equal to 20 Ω and the core layer 63 that is 0.08 mm thick, and the other has the resistance R equal to 20 Ω and the core layer 63 that is 0.13 mm thick. In each of the two samples, the first and second dielectric layers 62 and 64 are both 0.074 mm thick. The solid line is the insertion loss for the 0.08 mm thick core layer 63, and the broken line is that for the 0.13 mm thick core layer 63. It can be seen from FIG. 7 that the insertion loss of the coupler 60 becomes lower as the core layer 63 becomes thicker, while only a slight insertion loss is observed by increasing the thickness of the core layer 63 from 0.08 mm to 0.13 mm. It can be said that the insertion loss for a thickness of 0.08 mm is tolerable.

Figure 8:
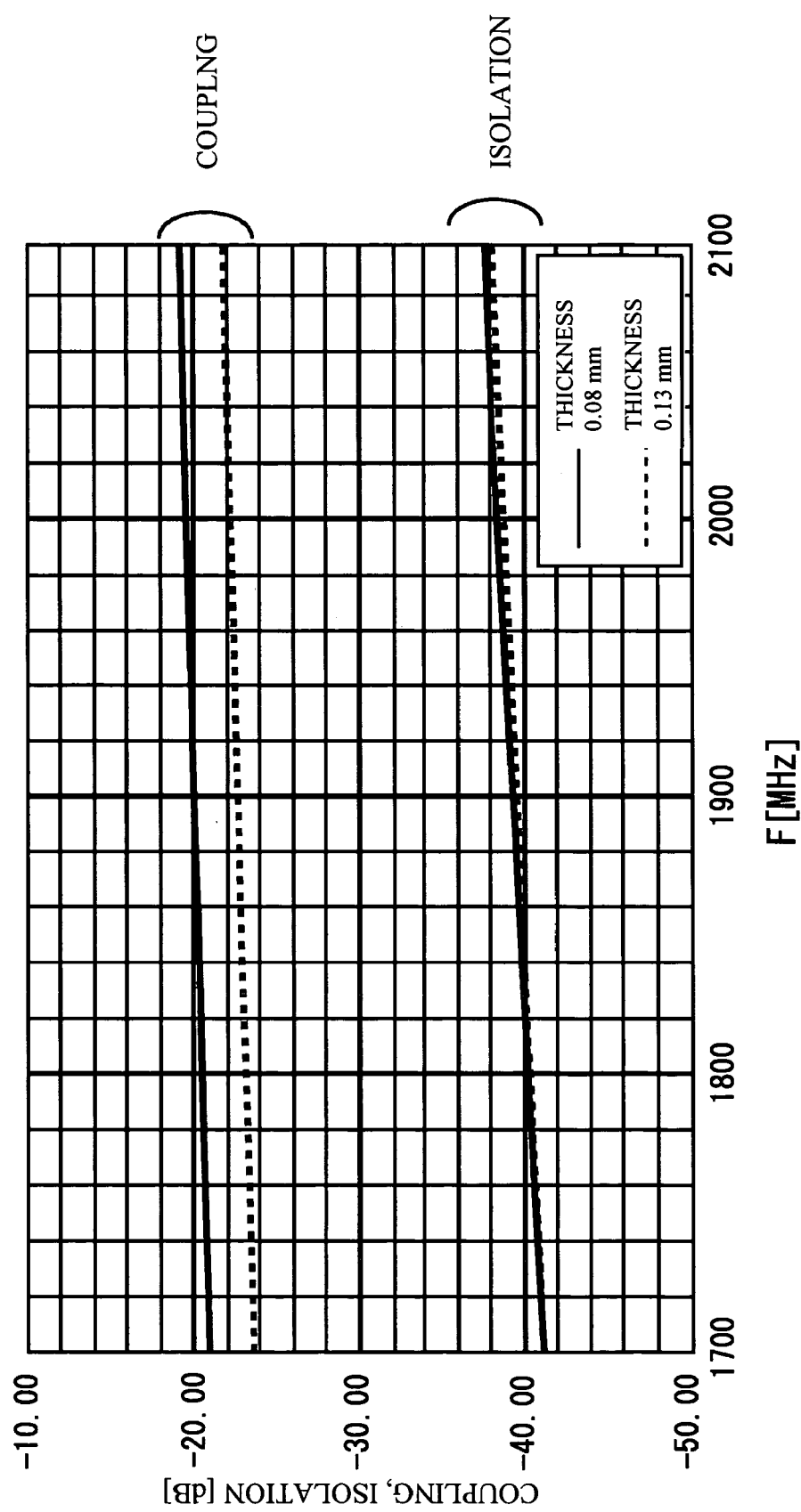
FIG. 8 is a graph of a coupling/isolation vs. frequency characteristic of the above-mentioned two samples of the coupler.

FIG. 8 is a graph of a coupling/isolation vs. frequency characteristic of the above-mentioned two samples of the coupler 60. The isolation indicates the degree of leakage of power from the output to the input of the coupler 60. The solid lines are the characteristics of the coupler 60 with the 0.08 mm thick core layer 63, and the broken lines are those with the 0.13 mm thick core layer 63. There is little difference in the isolation characteristic between the two samples, while there is a great difference in the coupling characteristic. As the core layer 63 becomes thicker, the coupling characteristic is degraded.

Figure 9:
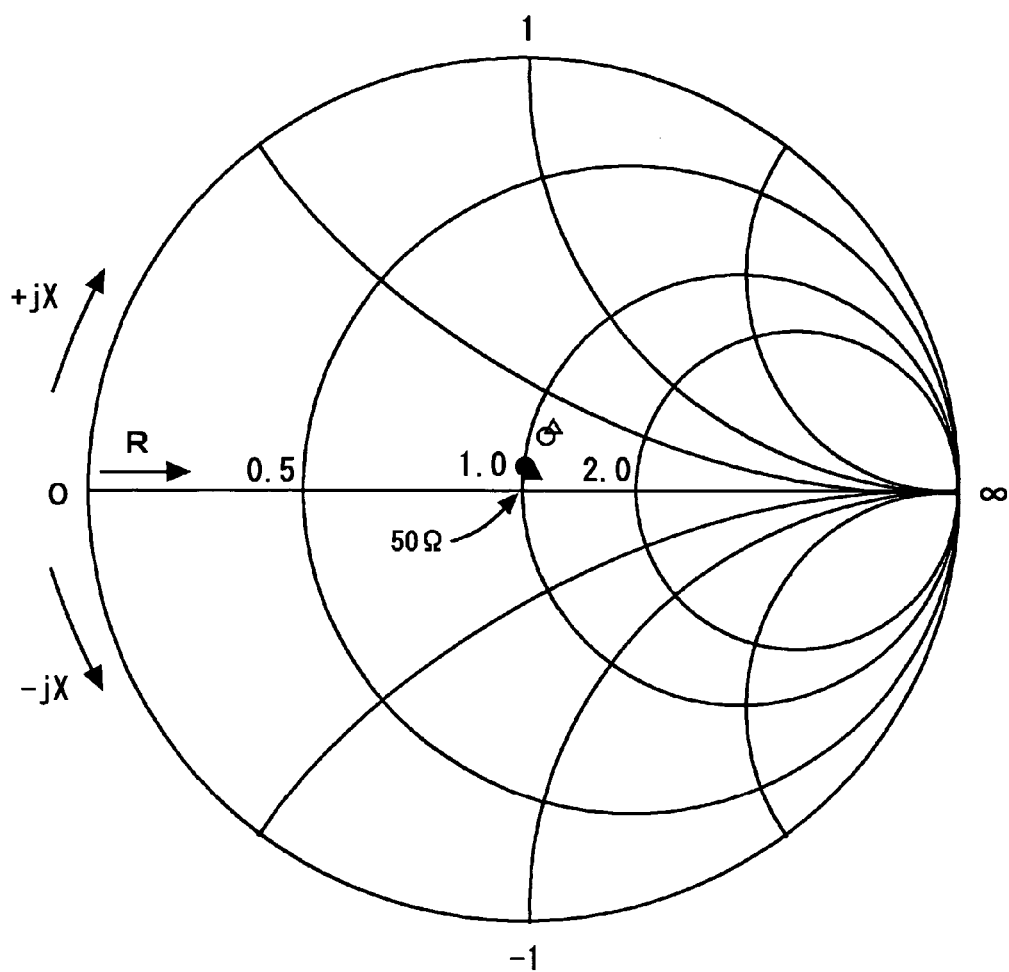
FIG. 9 is a Smith chart showing the impedance characteristics of the two samples of the coupler.

FIG. 9 is a Smith chart showing the impedance characteristics of the two samples to which the circuit elements of the radio frequency section 40A are mounted. The coupler 60 is close to an ideal impedance of 50 Ω when the core layer 63 is 0.08 mm thick. In contrast, the coupler 60 has an impedance that considerably deviates from the ideal impedance when the core layer 63 is 0.13 mm thick. In this case, the core layer 63 is comparatively thick and increases the height of the transmission module 40 of the radio frequency section.

From the above considerations, preferably, the core layer 63 is substantially 0.08 mm thick, and the first and second dielectric layers 62 and 64 are 0.074 mm thick.

The present invention is not limited to the specifically disclosed embodiments, and variations and modifications may be made without departing from the scope of the present invention.

The present invention is based on Japanese Patent Application No. 2004-218002 filed on Jul. 26, 2004, the entire disclosure of which is hereby incorporated by reference.

What is claimed is:

1. A transmission module comprising:
a power amplifier amplifies power of a radio frequency signal that is to be transmitted via an antenna;
a duplexer that allows the transmitted signal to travel from the power amplifier to the antenna, allows a received signal to travel from the antenna to a radio frequency receiver side, and prevents the received signal from traveling to the power amplifier, the received signal being received by the antenna and having a different frequency from the transmitted signal;
a coupler that allows the transmitted signal from the power amplifier to travel toward the duplexer, prevents a part of power of the received signal being leaked from the antenna via the duplexer from traveling to the power amplifier, and causes the part of power of the received signal to flow to ground, the coupler being provided between the power amplifier and the duplexer;
a detector detecting part of the transmitted signal branched into the detector by the coupler;
a controller controlling the power amplifier based on the part of the transmitted signal detected by the detector; and
a substrate provided with the power amplifier, the coupler, the duplexer, the detector and the controller,
wherein
the substrate includes a first dielectric layer, a core layer and a second dielectric layer, which layers are laminated;
the coupler includes multiple striplines respectively provided on two opposing surfaces of the core layer;
a region defined by the projecting one of the multiple striplines onto another of the multiple striplines is smaller than said another of the multiple striplines and is included in said another of the multiple striplines.

2. The transmission module as claimed in claim 1, further comprising:
a filter that is arranged in front of the power amplifier and eliminates unnecessary components from the transmitted signal, the filter being mounted on the substrate.

3. The transmission module as claimed in claim 1, wherein the coupler has multiple striplines.

4. The transmission module as claimed in claim 1, wherein the coupler has multiple striplines respectively provided on different layers that form the substrate.

* * * * *